(12) United States Patent
Ueda

(10) Patent No.: US 9,172,891 B2
(45) Date of Patent: Oct. 27, 2015

(54) DISPLAY DEVICE, METHOD OF CONTROLLING DISPLAY DEVICE, AND COMPUTER PROGRAM PRODUCT

(71) Applicant: Seiko Epson Corporation, Tokyo (JP)

(72) Inventor: Yusuke Ueda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/340,173

(22) Filed: Jul. 24, 2014

(65) Prior Publication Data

US 2014/0333839 A1  Nov. 13, 2014

Related U.S. Application Data

(63) Continuation of application No. 13/251,834, filed on Oct. 3, 2011.

(30) Foreign Application Priority Data

Oct. 8, 2010  (JP) .................................. 2010-228794

(51) Int. Cl.
*H04N 5/268* (2006.01)
*H04N 5/262* (2006.01)
(Continued)

(52) U.S. Cl.
CPC ............... *H04N 5/2624* (2013.01); *G09G 5/14* (2013.01); *H04N 5/4403* (2013.01); *H04N 5/765* (2013.01); *H04N 21/4221* (2013.01); *H04N 21/42216* (2013.01); *H04N 21/4858* (2013.01);
(Continued)

(58) Field of Classification Search
CPC ...... G09G 5/14; H04N 5/4403; H04N 21/412
See application file for complete search history.

(56) References Cited

U.S. PATENT DOCUMENTS 7,364,313 B2   4/2008  De Meerleer
2005/0078101 A1  4/2005  Shigeta
(Continued)

FOREIGN PATENT DOCUMENTS

JP     8-331471 A    12/1996
JP  2001-024959 A     1/2001
(Continued)

OTHER PUBLICATIONS

Non-Final Office Action received in U.S. Appl. No. 13/251,834; Jul. 15, 2013.

(Continued)

*Primary Examiner* — Dwayne Bost
*Assistant Examiner* — Sepehr Azari
(74) *Attorney, Agent, or Firm* — ALG Intellectual Property, LLC

(57) ABSTRACT

A display device including a display section configured to display an image; a display control section configured to arrange a plurality of display areas in a display range of the display section and display an image in each of the display areas; an image selection section configured to select the image to be displayed in each of the display areas from a plurality of input images; and a multi-screen display control section configured to display an image designation panel designating an image of a display object out of the plurality of input images on the display section, determine the images to be displayed in all of the display areas in a lump if the images to be displayed in all of the display areas are designated during display of the image designation panel and a determination operation is performed, and make the image selection section select the images determined.

11 Claims, 5 Drawing Sheets

(51) Int. Cl.
   *G09G 5/14*      (2006.01)
   *H04N 5/44*      (2011.01)
   *H04N 5/765*     (2006.01)
   *H04N 21/422*    (2011.01)
   *H04N 21/485*    (2011.01)
   *H04N 21/488*    (2011.01)
   *G09G 5/36*      (2006.01)
   *H04N 5/76*      (2006.01)

(52) U.S. Cl.
   CPC ........... *H04N21/4882* (2013.01); *G09G 5/363* (2013.01); *G09G 2360/02* (2013.01); *H04N 5/76* (2013.01)

(56) References Cited

U.S. PATENT DOCUMENTS

| | | | |
|---|---|---|---|
| 2008/0024666 A1 | 1/2008 | Sudo et al. | |
| 2009/0167946 A1 | 7/2009 | Samada et al. | |
| 2009/0201420 A1 | 8/2009 | Brown et al. | |
| 2010/0007578 A1 | 1/2010 | Kikuchi et al. | |

FOREIGN PATENT DOCUMENTS

| | | |
|---|---|---|
| JP | 2004-252481 A | 9/2004 |
| JP | 2005-244716 A | 9/2005 |
| JP | 2006-295280 A | 10/2006 |
| JP | 2007-060297 A | 3/2007 |
| JP | 2007-150580 A | 6/2007 |
| JP | 2008-28936 A | 2/2008 |
| JP | 2010-020411 A | 1/2010 |
| JP | 2010-056832 A | 3/2010 |

OTHER PUBLICATIONS

Final Office Action received in U.S. Appl. No. 13/251,834; Nov. 8, 2013.
Notice of Allowance and Notice of Allowability received in U.S. Appl. No. 13/251,834; Apr. 30, 2014.
Corrected Notice of Allowability received in U.S. Appl. No. 13/251,834; Jul. 3, 2014.

DISPLAY DEVICE, METHOD OF CONTROLLING DISPLAY DEVICE, AND COMPUTER PROGRAM PRODUCT

CROSS-REFERENCE

The present application is a continuation application of U.S. patent application Ser. No. 13/251,834 filed on Oct. 3, 2011, which claims priority from Japanese Patent Application No. 2010-228794 filed on Oct. 8, 2010, which are hereby incorporated by reference in their entirety.

BACKGROUND

In the past, there has been known a so-called multi-screen display function for displaying a plurality of screens side by side using a display device (see, e.g., Japanese Patent Publication No. 8-331471 (Document 1) and Japanese Patent Publication No. 2006-295280 (Document 2)).

When changing the image displayed on each screen of the multi-screen display function, an operation for selecting which image is displayed is required for each screen, and there arises a problem that the operation becomes more cumbersome as the number of screens increases. In order for solving the problem, the device described in Document 1, for example, is arranged to automatically start two-screen display after turning ON the power, so that a viewer's favorite image is displayed on at least either one of the screens. Further, in Document 2, for example, there is disclosed a configuration in which the television program displayed on either one of the screens is switched in response to the operation of a predetermined key provided to a remote controller while the television receiver is performing the multi-screen display. However, although such devices as described above are made, if the image to be displayed is selected in each of the screens on which the multi-screen display is performed, the cumbersome operation is required, and therefore, further simplification of the operation has been required.

SUMMARY

Various embodiments may allow a user to perform the work of selecting the image to be displayed on every screen displayed using the multi-screen function with a simpler operation.

According to at least one embodiment of the disclosure, there is provided a display device including a display section configured to display an image, a display control section configured to arrange a plurality of display areas in a display range of the display section and display an image in each of the display areas, an image selection section configured to select the image to be displayed in each of the display areas from a plurality of input images, and a multi-screen display control section configured to display an image designation panel adapted to designate an image of a display object out of the plurality of input images on the display section, determine the images to be displayed in all of the display areas in a lump if the images to be displayed in all of the display areas are designated by an operation during display of the image designation panel and a determination operation is performed, and make the image selection section select the images determined.

According to this aspect of the embodiment, when performing the multi-screen display for arranging a plurality of display areas in the display range, it is possible to designate the image to be displayed in each of the display areas using the image designation panel, and the images of the respective display areas designated by the operation during the display of the image designation panel are determined in a lump. Therefore, it is possible for the user to perform selection and switching of the images to be displayed in all of the display areas with a simple and easy operation.

According to at least one embodiment of the disclosure, there is provided the display device described above, wherein the multi-screen display control section, if either of the input images is designated by the operation during the display of the image designation panel, changes the image designation panel so as to prevent an input image, which is not allowed to be displayed simultaneously with the input image designated, from being designated.

According to this aspect of the embodiment, in the case in which there are input images not allowed to be displayed simultaneously in the respective areas to be displayed side-by-side by the display section, the image designation panel is changed so as to prevent these input images from being selected simultaneously. Thus, the user can easily select the images to be displayed in the plurality of display areas with the allowable combination without considering the constraints by the system by him or herself.

According to at least one embodiment of the disclosure, there is provided the display device described above, wherein a plurality of input images of the same type is arranged to be able to be input, and the multi-screen display control section, if either of the input images is designated by the operation during the display of the image designation panel, changes a display form of the image designation panel so as to prevent an input image, which is of the same type as the input image designated, from being designated.

According to this aspect of the embodiment, if the user designates either one of the input images by the operation during the display of the image designation panel, the input image not allowed to be displayed simultaneously in combination with the input image thus designated becomes prevented from being designated. Thus, the user can easily select the images to be displayed in the plurality of display areas with the allowable combination without considering the constraints by the system by him or herself.

According to at least one embodiment of the disclosure, there is provided the display device described above, wherein the multi-screen display control section, if either of the input images is designated by the operation during the display of the image designation panel, and an operation of designating an input image, which is not allowed to be displayed simultaneously with the input image already designated, is operated, displays a warning.

According to this aspect of the embodiment, if the user designates either one of the input images by the operation during the display of the image designation panel, and then performs an operation for designating the input image not allowed to be displayed simultaneously in combination with the input image thus designated, the warning is displayed. Thus, the user can easily select the images to be displayed in the plurality of display areas with the allowable combination without considering the constraints by the system by him or herself.

According to at least one embodiment of the disclosure, there is provided a method of controlling a display device including: providing a display device which arranges a plurality of display areas in a display range of a display section, selects an image to be displayed in each of the display areas from a plurality of input images, and displays the selected images in the respective display areas, displaying an image designation panel adapted to designate an image of a display object out of the plurality of input images on the display section, determining the images to be displayed on all of the display areas in a lump in response to designation of the images to be displayed on all of the display areas by an operation during the display of the image designation panel and a determination operation, and selecting the images determined from the input images and displaying the images selected.

By executing the method of controlling a display device according to this aspect of the embodiment, when the display device performs the multi-screen display for arranging a plurality of display areas in the display range, it is possible to designate the image to be displayed in each of the display areas using the image designation panel, and the images of the respective display areas designated by the operation during the display of the image designation panel are determined in a lump. Therefore, it is possible for the user to perform selection and switching of the images to be displayed in all of the display areas with a simple and easy operation.

According to at least one embodiment of the disclosure, there is provided a computer program product embodied in at least one computer readable medium and comprising computer instructions executable by a computer controlling a display device including a display section and allowing the computer to function as: a display control section adapted to arrange a plurality of display areas in a display range of the display section and display an image in each of the display areas, an image selection section adapted to select the image to be displayed in each of the display areas from a plurality of input images, and a multi-screen display control section adapted to display an image designation panel adapted to designate an image of a display object out of the plurality of input images on the display section, determine the images to be displayed in all of the display areas in a lump if the images to be displayed in all of the display areas are designated by an operation during display of the image designation panel and a determination operation is performed, and make the image selection section select the images determined.

By executing the program according to this aspect of the embodiment with a computer, when the display device performs the multi-screen display for arranging a plurality of display areas in the display range, it is possible to designate the image to be displayed in each of the display areas using the image designation panel, and the images of the respective display areas designated by the operation during the display of the image designation panel are determined in a lump. Therefore, it is possible for the user to perform selection and switching of the images to be displayed in all of the display areas with a simple and easy operation.

According to the aspects of the embodiment, in the case of performing the multi-screen display for arranging a plurality of display areas in the display range, the images to be displayed in all of the display areas can be selected and switched with an easier operation.

BRIEF DESCRIPTION OF THE DRAWINGS

Non-limiting and non-exhaustive embodiments of the present disclosure will be described with reference to the accompanying drawings, wherein like reference numbers reference like elements.

FIGS. 2A through 2D are explanatory diagrams showing specific examples of two-screen display, wherein FIGS. 2A, 2B, and 2C show examples of the two-screen display, and FIG. 2D shows an example of displaying a menu panel as an OSD image.

FIGS. 3A and 3B are explanatory diagrams showing specific examples of a setting screen according to the two-screen display, wherein FIG. 3A shows an example of the setting panel, and FIG. 3B shows an example of a source selection panel.

DESCRIPTION OF AN EMBODIMENT

Hereinafter, an embodiment of the invention will be described with reference to the accompanying drawings.

Figure 1:
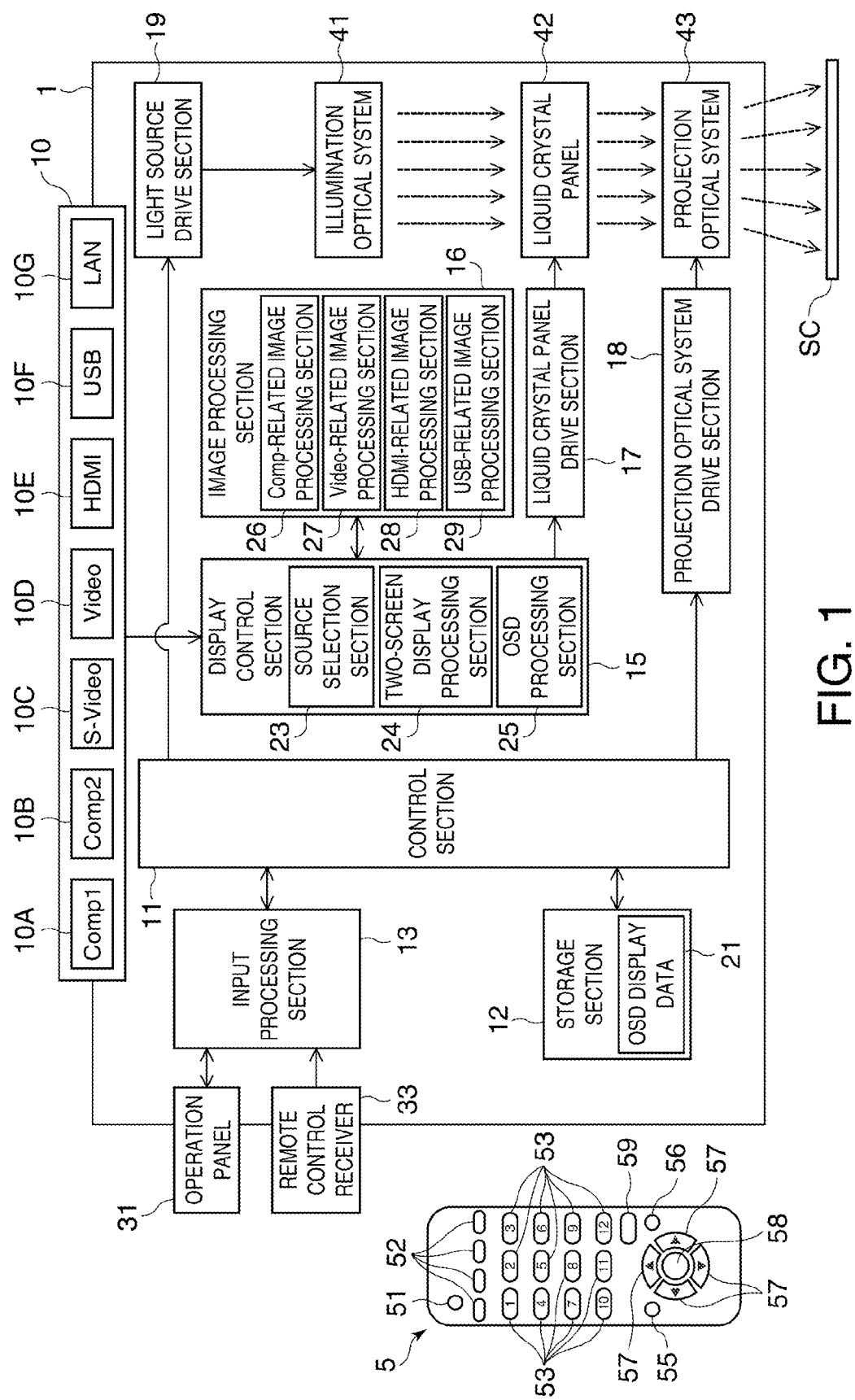
FIG. 1 is a block diagram showing a configuration of a projector according to an embodiment of the invention.

FIG. 1 is a block diagram showing an overall configuration of a projector 1 as a display device to which the invention is applied. The projector 1 is a device provided with an interface section 10 connected to an external image supply device (not shown) such as a personal computer or a variety of types of video players, and for projecting an input image input from the interface section 10 to a screen SC. Although the projector 1 is capable of displaying either of a still image and a moving image (a video), the case in which the video input from an image supply device is output for display is cited as an example in the following explanation.

The interface section 10 has interfaces 10A, 10B to be connected to video output terminals of computers, interfaces 10C, 10D, and 10E to be connected to video playback devices or DVD playback devices, an interface 10F to be connected to a USB terminal of a computer, and an interface 10G to be connected to a LAN configured including a computer.

The interfaces 10A, 10B are each configured including a VGA terminal to which an analog video signal is input from a computer, a digital visual interface (DVI) to which a digital video signal is input, and so on.

The interface 10C is provided with an S-video terminal to which a composite video signal such as NTSC, PAL, or SECAM is input from a video output device such as a video playback device, a DVD playback device, a television tuner, a set-top box of a CATV, or a video game machine.

The interface 10D is provided with an RCA terminal to which a composite video signal is input from the video output device described above or a D-terminal to which a component video signal is input therefrom.

The interface 10E has an HDMI connector compliant with the HDMI (registered trademark), and a digital video signal is input thereto from the video output device described above.

The interface 10F is provided with a USB terminal not shown and a USB controller (not shown) for transmitting/receiving control data and digital video data with the computer via the USB terminal. Further, the interface 10G is provided with a terminal such as an RJ-45 terminal to which a LAN cable can be connected, and is connected to a LAN including one or a plurality of computers via the terminal. The interface 10G is provided with a network interface circuit (not shown) compliant with, for example, the Ethernet (registered trademark), and transmits/receives control data and digital video data with the computer constituting the LAN.

Here, the devices (the image supply devices described above) connected to the interfaces 10A through 10G of the interface section 10 are referred to as input sources.

In the present embodiment, the screen SC stands roughly upright, and the screen surface is shaped like a rectangle. An image input to the projector 1 can be either of a moving image (a video) and a still image, and the projector 1 is capable of projecting the video on the screen SC and of continuously projecting the still image on the screen SC. In the embodiment described below, the explanation is presented citing the case of projecting the video based on the video signal input externally as an example. In other words, the process of displaying the input video in the explanation below can be applied to the case of displaying the still image input to the interface section 10 without modification.

The projector 1 is composed of an optical system for performing optical image formation and an image processing system for electrically processing the video signal in view of the general classification. The optical system is composed of an illumination optical system 41, a liquid crystal panel 42, and a projection optical system 43. The illumination optical system 41 is provided with a light source consisting of, for example, a xenon lamp, a super-high pressure mercury lamp, or an LED. Further, the illumination optical system 41 can be provided with a reflector and an auxiliary reflector for guiding the light emitted by the light source to the liquid crystal panel 42, and can be a system provided with, for example, a lens group (not shown) for improving the optical characteristics of the projection light, a polarization plate, or a photochromic element for reducing the light intensity of the light emitted by the light source on the path reaching the liquid crystal panel 42.

The liquid crystal panel 42 (a display section) receives the signal from the image processing system described later, and then forms the image on the panel surface. The liquid crystal panel 42 is composed of three liquid crystal panels corresponding respectively to three primary colors of RGB in order for performing color projection. Therefore, the light from the illumination optical system 41 is separated into colored lights of three colors of RGB, and the colored lights enter the corresponding liquid crystal panels, respectively. The colored lights modulated while passing through the respective liquid crystal panels are combined by a combining optical system such as a cross dichroic prism, and then output to the projection optical system 43.

The projection optical system 43 is provided with, for example, a zoom lens for performing expansion and contraction of the image to be projected and adjustment of the focus, a zoom controlling motor for controlling the level of the zoom, and a focus adjusting motor for performing the focus adjustment. The projection optical system 43 projects the incident light modulated by the liquid crystal panel 42 on the screen SC using the zoom lens and then images it.

To this optical system, there are connected a projection optical system drive section 18 for driving the respective motors provided to the projection optical system 43 in accordance with the control of the control section 11, and a light source drive section 19 for driving the light source provided to the illumination optical system 41 in accordance with the control of the control section 11.

Meanwhile, the image processing system is configured around the control section 11 for integrally controlling the whole of the projector 1, and is provided with a storage section 12 storing data to be processed by the control section 11 and a program to be executed by the control section 11, an input processing section 13 for detecting an operation via an operation panel 31 and a remote control receiver 33, a display control section 15 for processing the input video input via the interface section 10, an image processing section 16, and a liquid crystal panel drive section 17 for driving the liquid crystal panel 42 based on the video signal output from the display control section 15 to thereby perform drawing.

The control section 11 reads out and executes a control program stored in the storage section 12 to thereby control each section of the projector 1. The control section 11 detects the content of the operation performed by the user based on the operation signal input from the input processing section 13, and then controls the display control section 15, the projection optical system drive section 18, and the light source drive section 19 in accordance with the operation to thereby project the video on the screen SC.

The main body of the projector 1 is provided with the operation panel 31 having various switches for the user to perform the operation and indicator lamps. The operation panel 31 is connected to the input processing section 13, and the input processing section 13 appropriately lights or blinks the indicator lamps of the operation panel 31 in accordance with the operation state and the setting state of the projector 1 under the control of the control section 11. If the switch of the operation panel 31 is operated, the operation signal corresponding to the switch thus operated is output from the input processing section 13 to the control section 11.

Further, the projector 1 has a remote controller 5 used by the user. The remote controller 5 is provided with various types of buttons, and transmits the infrared signal in accordance with the operation of these buttons. The main body of the projector 1 is provided with the remote control receiver 33 for receiving the infrared signal emitted by the remote controller 5. The remote control receiver 33 decodes the infrared signal received from the remote controller 5 to thereby generate the operation signal representing the operation content in the remote controller 5, and then outputs it to the control section 11.

As shown in FIG. 1, the remote controller 5 is provided with a power button 51, a plurality of input switching buttons 52 for instructing switching of the input signals while the projector 1 performs usual display, a plurality of numeric keypad buttons 53 for performing input of numeric characters, a menu button 55 for instructing of display of a menu panel displayed as an OSD image, a "return" button 56 for instructing transition to the previous screen during the operation in the menu panel, a plurality of cursor button 57 for instructing transition to a selection item located on the left, right, top, or bottom during the operation in the menu panel, a "decision" button 58 for instructing determination of the selection content during the operation in the menu panel, and a "split" button 59 for instructing start of two-screen display. The plurality of numeric keypad buttons 53 is assigned not only with the function of input of numeric characters but also with functions as buttons for instructing zoom control, focus control, change in the color mode, change of the aspect ratio, mute, and so on, respectively.

The display control section 15 provided to the projector 1 is connected to the interface section 10, and the input video externally input to the interfaces 10A through 10G provided to the interface section 10 is input to the display control section 15. The display control section 15 is provided with a source selection section 23 (an image selection section) for selecting the video signal to be displayed on the liquid crystal panel 42 among the input video signals input from the interface section 10 under the control of the control section 11. The display control section 15 generates a display signal based on the video signal thus selected by the source selection section 23, and then output it to the liquid crystal panel drive section 17.

The image processing section 16 is connected to the display control section 15. The image processing section 16 performs image processing for converting the input video to be input from each of the input sources via the interface section 10 into a form suitable for the display of the liquid crystal panel 42. The image processing section 16 incorporates a computer-related image processing section 26, a video-related image processing section 27, an HDMI-related image processing section 28, and a USB-related image processing section 29.

The computer-related image processing section 26 is a processing section for processing the input video input to the interfaces 10A, 10B. Specifically, the processing section performs analog-digital conversion and interlace-progressive conversion on the video signal input from the computer, and further performs resolution conversion in accordance with the display resolution of the liquid crystal panel 42, and then outputs the video signal after the conversion to the display control section 15.

The video-related image processing section 27 performs the analog-digital conversion and the interlace-progressive conversion on the composite video signal or the component video signal input from the interfaces 10C, 10D, and further performs the resolution conversion in accordance with the display resolution of the liquid crystal panel 42, and then outputs the video signal after the conversion to the display control section 15.

The HDMI-related image processing section 28 appropriately performs the interlace-progressive conversion and the resolution conversion on the digital video signal input from the interface 10E in accordance with the specification of the liquid crystal panel 42, and then outputs the video signal after the conversion to the display control section 15.

The USB-related image processing section 29 buffers the digital video data input from the interfaces 10F, 10G, then appropriately performs format conversion thereon in accordance with the specification of the liquid crystal panel 42, and then outputs the video signal after the conversion to the display control section 15.

When the input source is selected by the source selection section 23 provided to the display control section 15, the input video from the input source thus selected is input to the image processing section 16. In the image processing section 16, the image processing corresponding to the specification of the input video is performed on the input video by the image processing section 26 through 29 corresponding to the input source selected by the source selection section 23, and the video signal with the predetermined format is output to the display control section 15.

In the case in which the projector 1 performs the two-screen display described later, since a plurality of videos are displayed on the screen SC, the source selection section 23 selects a plurality of input sources, and a plurality of video signals is input from the display control section 15 to the image processing section 16. The image processing section 16 processes the video signals with the image processing sections 26 through 29 corresponding to the respective video signals thus input, and then outputs the plurality of video signals to the display control section 15. It should be noted that neither one of the image processing sections 26 through 29 is capable of simultaneously processing the video signals of two or more input sources. The computer-related image processing section 26, for example, is not capable of processing the input video of either one of the interfaces 10A, 10B while processing the input video of the other thereof, and similarly, the video-related image processing section 27 also exclusively selects either one of the interfaces 10C, 10D, and then performs the processing. The same can be applied to the USB-related image processing section 29, and the USB-related image processing section 29 processes the input video of either one of the interfaces 10F, 10G. Therefore, if the source selection section 23 selects a plurality of input sources, it is restricted so as not to select input sources processed by the same image processing section among the image processing sections 26 through 29. Specifically, there is a restriction that it is not achievable to simultaneously select the interfaces 10A and 10B, the interfaces 10C and 10D, or the interfaces 10F and 10G.

The image processing sections 26 through 29 are each capable of setting the resolution of the video to be output to the display resolution suitable for the two-screen display instead of the display resolution of the liquid crystal panel 42 under the control of the control section 11. Further, it is also possible for each of the image processing sections 26 through 29 to control the brightness, the color, and the contrast of the video to be output under the control of the control section 11. Thus, it is possible to make the two videos displayed side-by-side provide a sensation of unity when performing the two-screen display.

The projector 1 is capable of performing the two-screen display for displaying two screens side-by-side on the screen SC in addition to the normal display for displaying a single screen on the screen SC. If the "split" button 59 of the remote controller 5 is operated in the condition of performing the normal display for displaying a single video on the screen SC, the two-screen display is started.

In the case of performing the two-screen display, the display control section 15 selects two video signals using the source selection section 23 when the projector 1 performs the two-screen display. The display control section 15 is provided with a two-screen display processing section 24 for performing the process of displaying the two videos side-by-side in the area projected on the screen SC. The two-screen display processing section 24 generates the video signal for simultaneously displaying the two video signals selected by the source selection section 23 side-by-side, and then outputs it to the liquid crystal panel drive section 17.

Figure 2A:
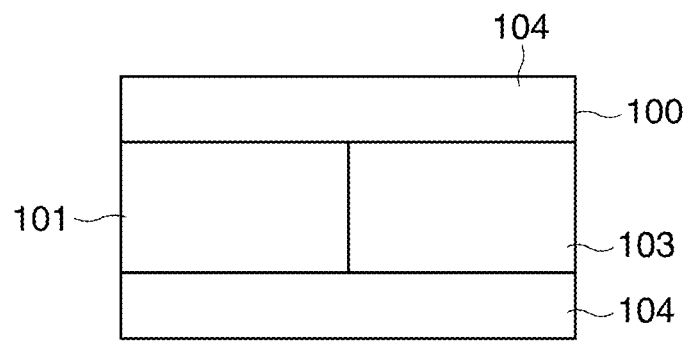
Figure 2B:
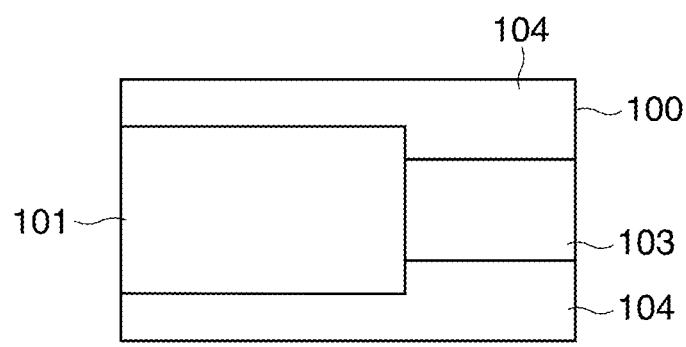
Figure 2C:
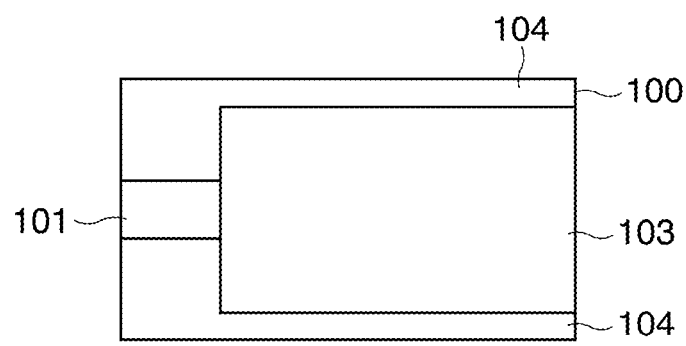
Figure 2D:
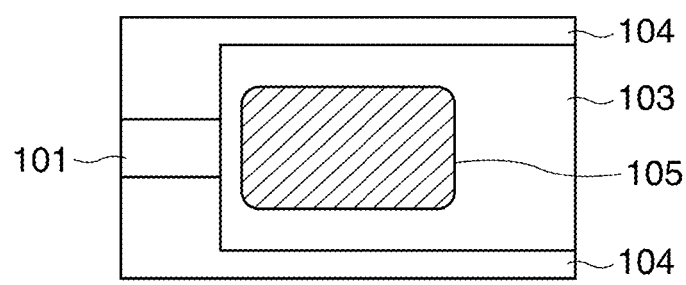

FIGS. 2A through 2D are explanatory diagrams showing specific examples of the two-screen display, wherein FIGS. 2A, 2B, and 2C show examples of the two-screen display, and FIG. 2D shows an example of displaying a menu panel as an OSD image.

In the examples shown in FIGS. 2A through 2D, the area on the screen SC in which the projector 1 can project an image is defined as a display range 100, and a plurality of display areas each for displaying a video is disposed in the display range 100. In the example shown in FIG. 2A, a left display area 101 and a right display area 103 having the same size are disposed laterally side-by-side. Further, in the example shown in FIG. 2B, the left display area 101 is displayed in a large size, and the right display area 103 is displayed in a small size. In contrast, in the example shown in FIG. 2C, the left display area 101 is disposed in a small size, and the right display area 103 is disposed in a large size. The sizes of the left display area 101 and the right display area 103, and the ratio between the sizes of the left display area 101 and the right display area 103 can arbitrarily be adjusted. It should be noted that although in either of the examples shown in FIGS. 2A through 2C there is shown a configuration of disposing the plurality of display areas arranged in a lateral direction, it is also possible to display the display areas arranged in a vertical direction or an oblique direction, and it is also possible to leave a blank space between the display areas. Further, in either of the examples shown in FIGS. 2A through 2C, the left display area 101 and the right display area 103 are displayed in a condition of keeping the aspect ratio of the original video. Therefore, the blank areas 104 other than the left display area 101 and the right display area 103 occur in the display range 100. However, it is also possible to perform the two-screen display so as not to cause the blank areas 104 by expanding or contracting the left display area 101 and the right display area 103 without keeping the aspect ratio. Further, it is also possible to dispose three or more display areas in the display range 100, and on this occasion, a plurality of display areas can be disposed in the display range 100 without a gap by adjusting the sizes of the display areas.

During the period in which the projector 1 performs the two-screen display, the videos of the input sources selected by the source selection section 23 (FIG. 1) among the input sources connected to the interface section 10 (FIG. 1) are displayed in the left display area 101 and the right display area 103, respectively. If the user wants to switch the videos to be displayed in the left display area 101 and the right display area 103, the user operates the menu button 55 of the remote controller 5 (FIG. 1). As shown in FIG. 2D, the menu panel 105 is displayed in the display range 100 in response to this operation. The menu panel 105 is displayed as an OSD image so as to be superimposed on the videos of the left display area 101 and the right display area 103.

As shown in FIG. 1, the display control section 15 is provided with an OSD processing section 25 for processing the video signal generated by the two-screen display processing section 24 to thereby generate the video signal for displaying the menu panel or the like as OSD images. Under the control of the control section 11, the OSD processing section 25 reads out OSD display data 21 stored in the storage section 12, and then displays the menu panel 105 (FIG. 2D), and a setting panel 107, a source selection panel 109, and so on described later superimposed on the videos based on the OSD display data 21.

Figure 3A:
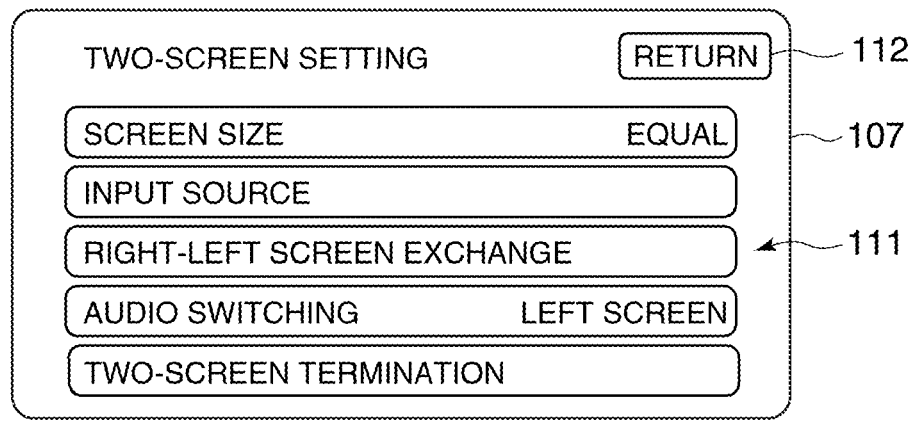
Figure 3B:
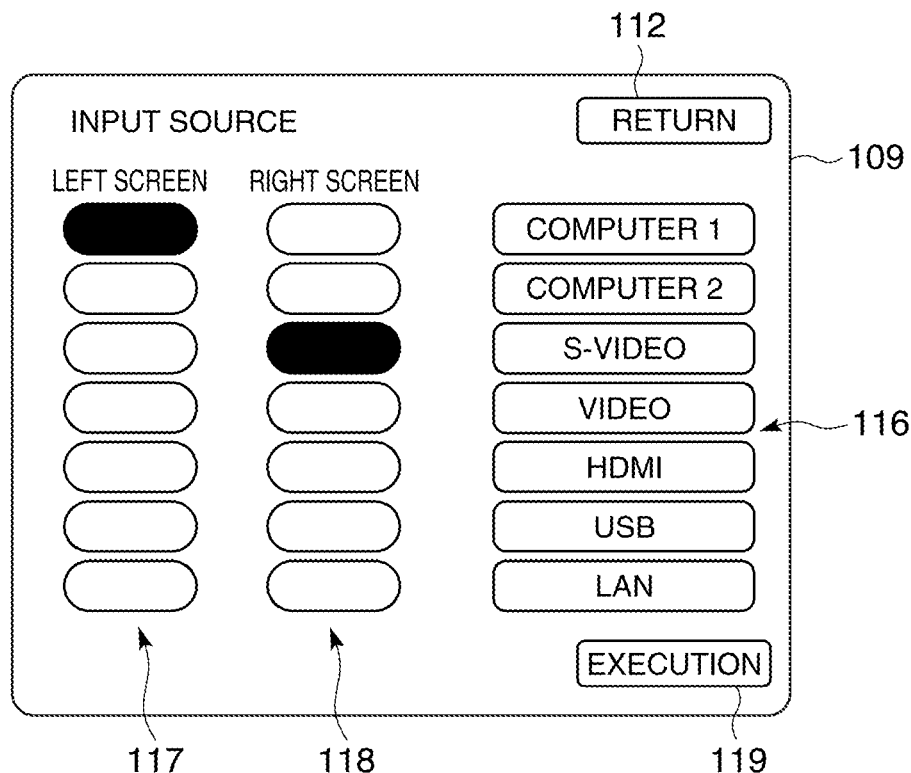

FIGS. 3A and 3B are explanatory diagrams showing specific examples of a setting panel (image designation panel) according to the two-screen display, wherein FIG. 3A shows an example of the setting panel 107, and FIG. 3B shows an example of the source selection panel 109.

If the menu button 55 of the remote controller 5 is operated in the condition in which the projector 1 is performing the normal display for displaying a single video on the screen SC or the two-screen display shown in FIGS. 2A through 2C, the control section 11 controls the display control section 15 to display the menu panel on the screen SC. The menu panel is displayed as an OSD image so as to be superimposed on the video, which has already been displayed. Further, if it is instructed by the operation of the remote controller 5 while displaying the menu panel that the setting regarding the two-screen display is performed, the control section 11 controls the OSD processing section 25 to display the setting panel 107 as an OSD image.

The setting panel 107 is a setting panel for performing various settings related to the two-screen display, and has an area for displaying that it is the setting panel 107 for the two-screen display located on the upper left of the panel, and various setting items 111 are disposed side-by-side at the center of the panel. As the setting items, there can be cited, for example, a "screen size" for setting the sizes (the ratio between the sizes) of the display areas disposed laterally side-by-side, "input sources" for setting the input sources of the videos to be displayed in the respective display areas, "right and left screen exchange" for exchanging the display positions of the two display areas, and "audio switching" for selecting the display area the audio of which is output out of the two display areas. Further, if the setting panel 107 is displayed during the two-screen display, the setting item for instructing the termination of the two-screen display is also displayed. Further, the setting panel 107 is provided with a return button 112 for instructing the transition to the original menu panel.

If the setting item "input sources" of the setting panel 107 is selected by the operation of the remote controller 5 while displaying the setting panel 107, the control section 11 controls the OSD processing section 25 to display the source selection panel 109. The source selection panel 109 is a panel for setting the input sources of the videos to be displayed in the two display areas presently displayed. There is an area displaying that it is the setting panel for the input sources on the upper left of the panel, and at the center of the panel there is disposed a source display section 116 for displaying the selectable input sources as a list. In the source display section 116, the interface 10A is displayed as "computer 1," the interface 10B is displayed as "computer 2," the interface 10C is displayed as "S-video," the interface 10D is displayed as "video," the interface 10E is displayed as "HDMI," the interface 10F is displayed as "USB," and the interface 10G is displayed as "LAN."

Further, on the left of the panel, there are disposed a left-screen cursor 117 for selecting the video to be displayed in the left display area 101 (FIG. 2A) and a right-screen cursor 118 for selecting the video to be displayed in the right display area 103 (FIG. 2A). In each of the left-screen cursor 117 and the right-screen cursor 118, it is possible to select just one input source, and the selected input source is highlighted (in reversed display in the drawing). The operation of selecting the input source is performed using the menu button 55 and the "decision" button 58 of the remote controller 5. When the one input source is selected by each of the left-screen cursor 117 and the right-screen cursor 118, and then an "execution" button 119 is selected, the selection in the source selection panel 109 is determined. Taking a cue from the determination, the control section 11 makes the source selection section 23 select the input sources.

Here, a series of operations for selecting the input sources in the projector 1 will be explained. In the following operations, the control section 11 functions as a multi-screen display control section.

Figure 4:
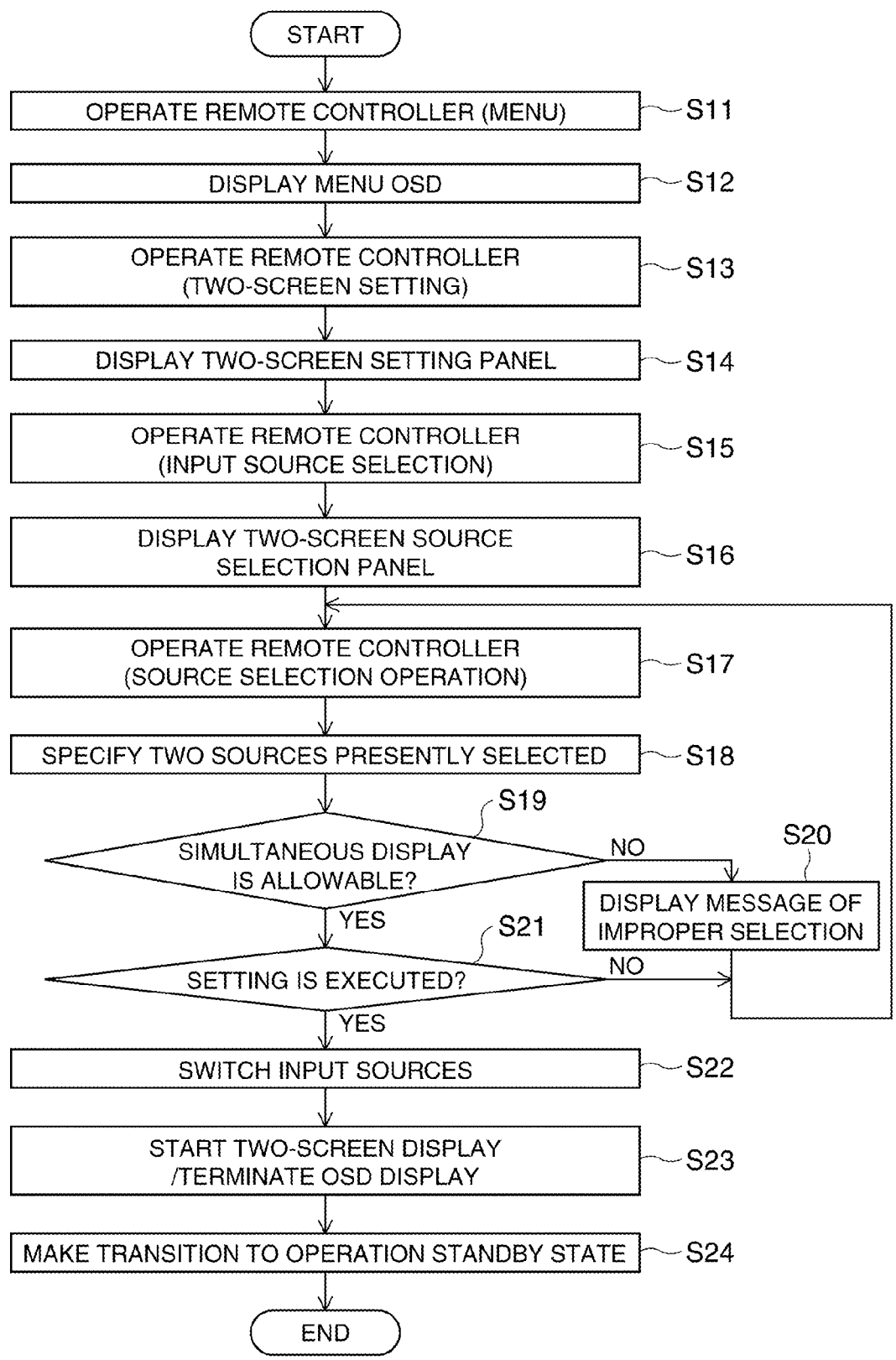
FIG. 4 is a flowchart showing operations of the projector.

FIG. 4 is a flowchart showing the operations of the projector 1.

If the operation of the menu button 55 of the remote controller 5 is performed (step S11) while the projector 1 performs the normal display or the two-screen display, the control section 11 controls the OSD processing section 25 to generate the video signal for displaying the menu panel as an OSD image, and then the liquid crystal drive section 17 displays the menu panel on the liquid crystal panel 42 based on the video signal (step S12). Here, if the transition to the setting panel 107 for performing the setting of the two-screen display is instructed by the operation of the remote controller 5 (step S13), the control section 11 controls the OSD processing section 25 to display the setting panel 107 on the liquid crystal panel 42 (step S14).

If the input source selection is instructed (step S15) by the operation of the remote controller 5 while displaying the setting panel 107, the control section 11 controls the OSD processing section 25 to display (step S16) the source selection panel 109 on the liquid crystal panel 42.

Here, if the input sources of the videos to be displayed respectively in the left-display area 101 and the right-display area 103 are selected by the operation of the cursor buttons 57 and the "decision" button 58 of the remote controller 5 (step S17), the control section 11 specifies (step S18) the two input sources presently selected. The control section 11 determines (step S19) whether or not the two input sources thus selected are the combination allowed to be displayed simultaneously. Since each of the image processing sections 26 through 29 provided to the image processing section 16 is not capable of simultaneously processing the videos of two input sources out of the corresponding input sources as described above, there exist combinations of the input sources which are not allowed to be displayed simultaneously. If the control section 11 determines that the combination of the input sources presently selected obtained in the step S18 corresponds to the combination thereof not allowed to be displayed simultaneously (NO in step S19), the control section 11 displays (step S20) a message that the input sources are not allowed to be selected simultaneously in the source selection panel 109 or superimposed on the source selection panel 109, then releases the selection state of the input sources presently selected, and then returns to the step S17 to enable selection by the operation of the remote controller 5 again.

Further, if the control section 11 determines that the combination of the input sources presently selected obtained in the step S18 is the combination thereof allowed to be displayed (YES in step S19), the control section 11 waits (step S21) for the operation of determining the two input sources presently selected, namely until the "execution" button 119 is selected. Here, if the "execution" button 119 is not selected within a predetermined period of time, the process returns to the step S17. Further, if the "execution" button 119 is selected, the control section 11 determines the input sources thus selected as the input sources of the respective display areas, and then controls the source selection section 23 of the display control section 15 to select (step S22) the input sources. Subsequently, the control section 11 starts the two-screen display and, at the same time, terminates (step S23) the OSD display, projects the videos on the screen SC, then makes a transition to the state of waiting for the operation of the remote controller 5, and then terminates the present process.

As described above, since the message for warning that the input sources are not allowed to be selected simultaneously is displayed if the combination of the input sources not allowed to be displayed simultaneously is selected in the source selection panel 109, it is possible for the user to select the combination complying with the specifications of the projector 1 even if the user does not remember by him or herself the combinations thereof allowed to be displayed simultaneously. Further, since the warning display described above is displayed in the state in which the two input sources are selected prior to the determination by the "execution" button 119, the user can easily make a selection again.

Figure 5:
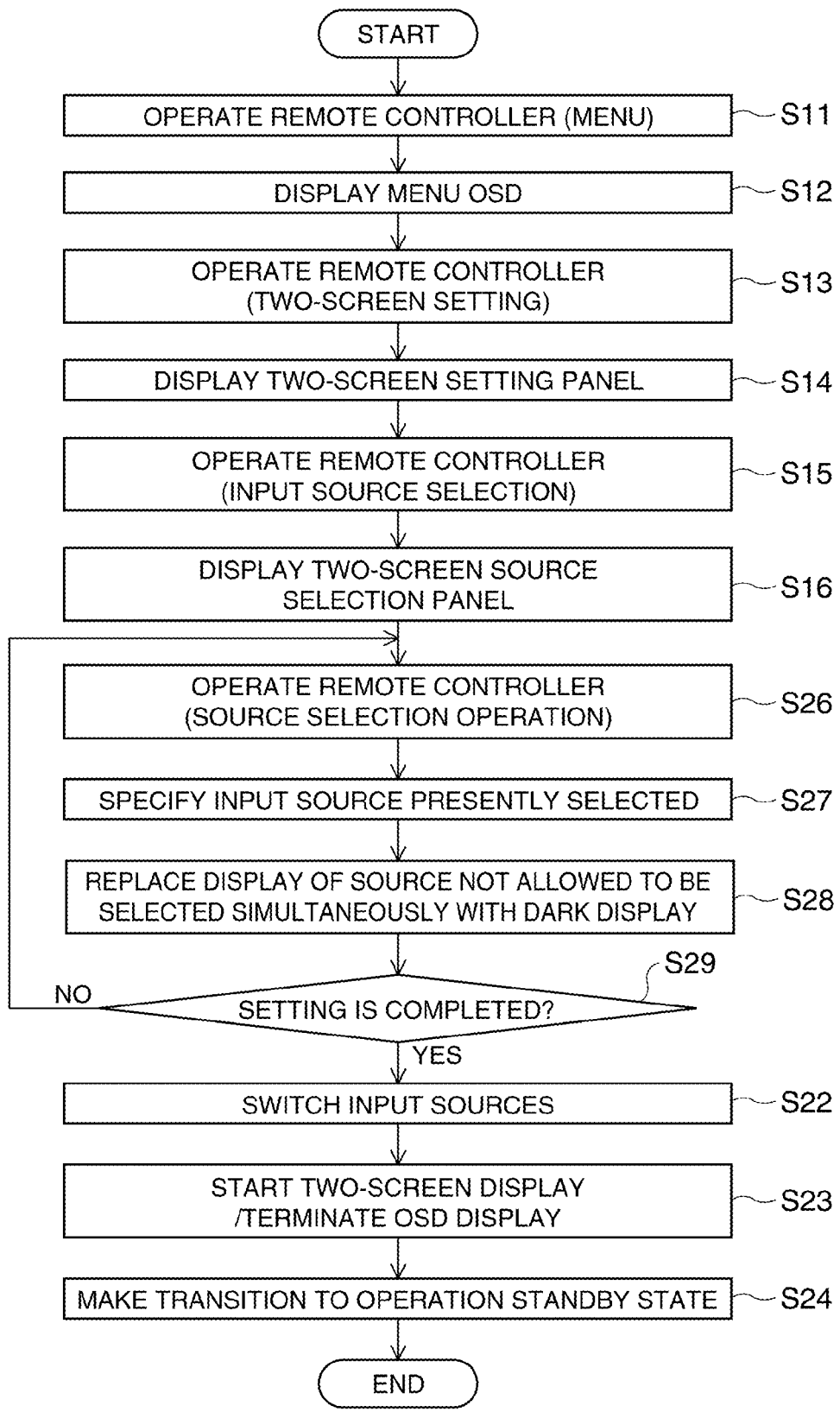
FIG. 5 is a flowchart showing operations of the projector.

Further, it is also possible to change the display configuration of the source selection panel 109 so that the combinations of the input sources not allowed to be displayed simultaneously cannot be selected in addition to performing the warning display. FIG. 5 shows the operation in this case.

FIG. 5 is a flowchart showing a modified example of the operation shown in FIG. 4.

In the operation shown in FIG. 5, the operation corresponding to the steps S11 through S16 is performed similarly to the case shown in FIG. 4. In the step S17, if the input source of the video to be displayed in either of the left-display area 101 and the right-display area 103 is selected by the operation of the cursor buttons 57 and the "decision" button 58 of the remote controller 5 (step S26), the control section 11 specifies (step S27) the one input source presently selected. Subsequently, the control section 11 replaces the display of the input source, which is not allowed to be displayed simultaneously with the input source presently selected, with dark display, and at the same time, sets the input to the unselectable state (step S28).

If, for example, the "computer 1" is selected with the left-screen cursor 117 in FIG. 3B, the control section 11 replaces the "computer 2" of the right-screen cursor 118 with the dark display in order for clearly showing that it is unselectable. Further, the control section 11 set the state in which the "computer 2" cannot be selected with the right-screen cursor 118 in response to the operation of the "decision" button 58 (FIG. 1).

Subsequently, the control section 11 waits until the input source other than the input source with the dark display is selected and then the "execution" button 119 is selected (step S29). Here, if the "execution" button 119 is not selected within a predetermined period of time, the process returns to the step S26. Further, if the "execution" button 119 is selected, the control section 11 determines the input sources thus selected as the input sources of the respective display areas, and then executes the process corresponding to the steps S22 through S24.

As described above, the projector 1 according to the embodiment to which the invention is applied is provided with the liquid crystal panel 42 for displaying the still images and the videos, the display control section 15 for disposing the plurality of display areas 101, 103 side-by-side in the display range 100 of the liquid crystal panel 42, and displaying the videos in the respective display areas 101, 103, and the source selection section 23 for selecting the input sources of the videos to be displayed in the respective display areas 101, 103 out of the plurality of input videos. Further, under the control of the control section 11, the projector 1 displays the source selection panel 109 for designating the video of the display object out of the plurality of input videos on the liquid crystal panel 42, determines the videos to be displayed in all of the display areas 101, 103 in a lump if the videos to be displayed in all of the display areas 101, 103 are selected and then the determination operation is performed by the operation of the remote controller 5 during the display of the source selection panel 109, and then makes the source selection section 23 select the videos thus determined. Therefore, in the case of performing the two-screen display for disposing the plurality of display areas 101, 103 side-by-side in the display range 100, the videos to be displayed in the respective display areas 101, 103 can be designated with the source selection panel 109, and thus the videos of the respective display areas 101, 103 designated by the operation of the remote controller 5 during the display of the source selection panel 109 are determined in a lump, the videos of the input sources determined by the display control section 15 are selected, then displayed. Therefore, it is possible for the user to perform selection and switching of the videos to be displayed in the two display areas 101, 103 with a simple and easy operation.

When either of the input sources is selected by the operation of the remote controller 5 during the display of the source selection panel 109, if the input source not allowed to be displayed simultaneously with the input source thus selected is selected, the projector 1 displays the warning message on the source selection panel 109 or superimposed on the source selection panel 109 as shown in FIG. 4. Therefore, the user can easily select the input sources of the videos to be displayed in the plurality of display areas 101, 103 with the allowable combination without considering the constraints by the system by him or herself.

Further, the projector 1 is provided with the interface section 10 capable of inputting the plurality of input sources of the same type, and as shown in FIG. 5, if either of the input sources is designated by the operation of the remote controller 5 during the display of the source selection panel 109, the control section 11 changes the display configuration of the source selection panel 109 so as to prevent the input source, which is of the same type as the input source presently designated, from being designated. Specifically, if the user designates the input source with one of the left-screen cursor 117 and the right-screen cursor 118 of the source selection panel 109, the input source, which is not allowed to be displayed in combination with the input source thus designated, is prevented from being designated with the other of the cursors.

The computer-related interfaces 10A and 10B processed by the computer-related image processing section 26, the video-related interfaces 10C and 10D processed by the video-related image processing section 27, and the computer-related interfaces 10F and 10G processed by the USB-related image processing section 29 are each the input sources of the same type. Since these are not allowed to be selected simultaneously, if one of these is selected by the left-screen cursor 117 or the right-screen cursor 118, the control section 11 makes the other unselectable. Thus, the user can easily select the input sources of the videos to be displayed in the plurality of display areas 101, 103 with the allowable combination without considering the constraints by the system by him or herself.

It should be noted that the embodiment described above is nothing more than an example of a specific aspect to which the invention is applied, and therefore, does not limit the invention. Therefore, it is also possible to apply the invention as an aspect different from the embodiment described above. For example, although in the embodiment described above the explanation is presented citing the configuration in which the input sources of the videos displayed in the respective display areas 101, 103 are selected in accordance with the operation of the remote controller 5 during the display of the source selection panel 109 as an example, the invention is not limited thereto. The input sources can be selected by the operation of the switches provided to the operation panel 31, and it is also possible to adopt the configuration in which the remote controller 5 is provided with an operator having a stick shape or a dial shape in addition to the buttons, and the input sources are selected by the operation of such an operator. Further, although in the embodiment described above the explanation is presented citing the case of disposing the two display areas 101, 103 side-by-side in the display range 100 in the screen SC as an example, the invention is not limited thereto, but it is also possible to perform the display with more videos arranged.

Further, although in the embodiment described above the explanation is presented citing, as an example, the configuration of using the liquid crystal panel 42 composed of the three transmissive or reflective liquid crystal panels corresponding to the respective colors of RGB as the display section for modulating the light emitted by the light source, the invention is not limited thereto, but can be configured using a system including one liquid crystal panel and a color wheel combined with each other, a system using three digital mirror devices (DMD), a DMD system using one digital mirror device and a color wheel combined with each other, and so on. Here, in the case of using the just one liquid crystal panel or DMD, the member corresponding to the combining optical system such as the cross dichroic prism is not necessary. Further, besides the liquid crystal panel or the DMD, any configuration capable of modulating the light emitted from the light source can be adopted without problems.

Further, although in the embodiment described above the explanation is presented assuming that there is adopted the configuration of selecting the input images input from the plurality of input sources to the interface section 10 and processing them with the image processing section 16, the invention is not limited thereto, but there can be adopted a configuration of executing the series of processes with the image supply device such as a personal computer externally connected to the projector 1. The image supply device in this case can be arranged to be provided with the functions of the control section 11, the storage section 12, the display control section 15, and image processing section 16 provided to the projector 1. Further, the invention can also be realized as a program executed by such a device. In such a configuration, it is sufficient for the projector 1 to be arranged to project the image input from the image supply device described above to the screen SC.

Further, the display device according to the invention is not limited to the projector for projecting the videos to the screen SC, but various display devices including a liquid crystal monitor or a liquid crystal television set for displaying images/videos on a liquid crystal panel, a monitor device or a television receiver for displaying images/videos on a plasma display panel (PDP), a light emitting display device such as a monitor device or the television receiver for displaying images/videos on an organic EL display panel called an organic light-emitting diode (OLED), an organic electroluminescence (OEL), and so on can also be included in the image display device according to the invention. In this case, the liquid crystal panel, the plasma display panel, and the organic EL display panel correspond to the display section.

Further, each of the functional sections of the projector 1 shown in FIG. 1 is for showing the functional configuration of the projector 1, and the specific mounting forms are not particularly limited. In other words, it is not necessarily required to mount the hardware corresponding individually to each of the functional sections, but it is obviously possible to adopt the configuration of realizing the functions of the plurality of functional sections by one processor executing the program. For example, it is also possible to configure the whole of the image processing section 16 including the image processing sections 26 through 29 with a single device, or it is also possible to realize the functions of the display control section 15 and the image processing section 16 with a single device. Further, a part of the function realized by the software in the embodiment described above can also be realized by hardware, or a part of the function realized by hardware can also be realized by software. Besides the above, the specific detailed configuration of the projector 1 can arbitrarily be modified within the scope or the spirit of the invention.

What is claimed is:
1. A display device comprising:
 a display section configured to display an image comprising a plurality of input images from different input sources;
 a display control section configured to arrange a plurality of display areas in a display range of the display section and display an input image in each of the display areas;
 a source selection section configured to select, from a plurality of input sources, the input sources of the input images to be displayed in the display range, the plurality of input sources including two or more input sources of a same type; and
 a multi-screen display control section configured to:
 display a source designation panel adapted to designate an input source out of the plurality of input sources, and
 perform, if any of the two or more input sources of the same type is designated during the display of the source designation panel, at least one of:
 change the source designation panel so as to prevent another of the two or more input sources of the same type from being designated, and
 display a warning if an operation of designating the another of the two or more input sources of the same type is operated.

2. The display device according to claim 1, wherein:
the multi-screen display control section changes the source designation panel so as to prevent the another of the two or more input sources of the same type from being designated by changing a display form of the source designation panel.

3. A method of controlling a display device, comprising:
providing a display device which arranges a plurality of display areas in a display range of a display section, selects an input source of an input image to be displayed in each of the display areas from a plurality of input sources, the plurality of input sources including two or more input sources of a same type connected to the display device, and displays the input images of the selected input sources in the respective display areas;
displaying a source designation panel adapted to designate the input sources of the input images out of the plurality of input sources on the display section;
determining the input sources of the input images to be displayed on all of the display areas;
and performing, if any of the two or more input sources of the same type is designated by the operation during the display of the source designation panel, at least one of:
changing the source designation panel so as to prevent another of the two or more input sources of the same type from being designated, and displaying a warning if an operation of designating the another of the two or more input sources of the same type is operated.

4. The display device according to claim 3, wherein:
the changing the source designation panel so as to prevent another of the two or more input sources of the same type from being designated comprises changing a display form of the source designation panel.

5. A display device comprising:
a display section configured to display a plurality of input images;
a source selection section configured to select, from a plurality of input sources, the input sources to be displayed by the display section;
a display control section configured to arrange a plurality of display areas and display an input image in each of the display areas; and
a multi-screen display control section configured to display a source designation panel adapted to designate the input source out of the plurality of input sources,
wherein the multi-screen display control section, if any of the input sources is designated, performs at least one of:
changes the source designation panel so as to prevent designation of another input source of the same type as the input source designated, and
displays a warning if an operation of designating the another input source of the same type as the input source designated is operated.

6. The display device according to claim 5, wherein:
the multi-screen display control section changes the source designation panel so as to prevent the another input source from being designated by changing a display form of the source designation panel.

7. A method of controlling a display device, comprising:
providing a display device which arranges a plurality of display areas, selects an input source of an input image to be displayed in each of the display areas from a plurality of input sources, the plurality of input sources including two or more input sources of a same type, and displays the input images of the selected input sources in the respective display areas;
displaying a source designation panel adapted to designate the input sources out of the plurality of input sources on the display section;
determining the input sources of the input images to be displayed;
performing, if any of the input sources is designated by the operation, at least one of:
changing the source designation panel so as to prevent another input source of the same type as the input source designated from being designated, and
displaying a warning if an operation of designating the another input source of the same type as the input source designated is operated.

8. The method of controlling a display device according to claim 7, wherein:
the changing the source designation panel so as to prevent the another input source from being designated comprises changing a display form of the source designation panel.

9. A display device comprising:
a source selection section configured to select a first input source and a second input source from a plurality of input sources;
a display section configured to display a first input image and a second input image, the first input image being based on the first input source and the second input image being based on the second input source; and
a multi-screen display control section configured to display a first source designation panel and a second source designation panel, the first source designation panel being adapted to designate the first input source from the plurality of input sources and the second source designation panel being adapted to designate the second input source form the plurality of input sources,
wherein the multi-screen display control section, if the first input source is designated, performs at least one of:
changes the second designation panel so as to prevent designation of another input source of the same type as the first input source, and
displays a warning if an operation of designating the another input source of the same type as the first input source.

10. The display device according to claim 9, wherein:
the multi-screen display control section changes the second source designation panel so as to prevent the another input source from being designated by changing a display form of the second source designation panel.

11. The display device according to claim 9, further comprising:
a display control section configured to arrange a first display area and a second display area in a display range, the display control section being configured to display the first input image in the first display area and display the second input image in the second display area.

* * * * *